United States Patent [19]

Sekiguchi

[11] 3,976,336

[45] Aug. 24, 1976

[54] ANTISKID DEVICE FOR AIR BRAKES
[75] Inventor: Yukichi Sekiguchi, Yono, Japan
[73] Assignee: Sanwa Seiki Mfg. Co., Japan
[22] Filed: Oct. 22, 1975
[21] Appl. No.: 624,706

[30] Foreign Application Priority Data
July 24, 1975 Japan.............................. 50-90443

[52] U.S. Cl. ................................. 303/21 F; 303/61
[51] Int. Cl.² ......................................... B60T 8/02
[58] Field of Search ................... 188/181 A, 181 R; 363/20, 21 BE, 21 EB, 21 F, 61

[56] References Cited
UNITED STATES PATENTS

| 3,731,980 | 5/1973 | Fink et al. ......................... 303/21 F |
| 3,749,125 | 7/1973 | Peruglia et al. ................ 303/21 F X |
| 3,913,983 | 10/1975 | Sekiguchi .......................... 303/21 F |

Primary Examiner—Duane A. Reger
Attorney, Agent, or Firm—Jay L. Chaskin

[57] ABSTRACT

The modulator of an antiskid device for air brakes mounted in a pressurized air line connecting a brake valve to brake actuators comprises a first valve which can move between an open position in which it allows pressurized air from the brake valve to pass freely therethrough and a throttling position in which it allows the pressurized air to pass therethrough in a reduced quantity, a second valve connected in series with the first valve and capable of moving between an open position in which it allows the pressurized air from the first valve to pass freely therethrough and a discharge position in which it permits pressurized air from the brake actuators to be discharged therethrough, a first air operating means for operating the first valve and a second air operating means for operating the second valve. The antiskid device comprises a signal producing means which first produces a throttling electric signal for actuating the first air operating means and moving the first valve to its throttling position before the braking pressure of the brake actuators reaches a pressure increase target value and then produces a pressure reducing electric signal for actuating the second air operating means and moving the second valve to its discharge position when the braking pressure has reached the target value so as to thereby maintain the slip rate at an optimum level of 0.2 or thereabout by changing the speed of the wheels. By this arrangement, an increase in the braking pressure applied by the brake actuators can be reduced in speed about the time the braking pressure reaches the target value so as to thereby avoid an excessive rise in the braking pressure above the target value which would otherwise occur due to a time lag of the initiation of a reduction in the braking pressure applied by the brake actuators behind the production of a pressure reducing electric signal. The time lag can be reduced by utilizing the force of air for actuating the first and second valves.

1 Claim, 8 Drawing Figures

ANTISKID DEVICE FOR AIR BRAKES

BACKGROUND OF THE INVENTION

This invention relates to air brakes for motor vehicles, and more particularly it is concerned with an antiskid device for air brakes which enables to apply the brake to stop the vehicle in a short braking distance without causing the hazard of skidding when the brake is applied.

The slip rate which indicates the degree of skidding of a wheel rotating on the road surface while the brake is being applied can be expressed as follows:

$$S = \frac{Vv - Vw}{Vv} \text{ or } Vw = (1 - S) Vv$$

where $Vv$ is the speed of the motor vehicle and $Vw$ is the speed of the wheel. When $S = 1$, the rotational movement of the wheel is stopped by the high braking force in spite of the fact that the motor vehicle is still in operation, so that the wheel is brought to a locked condition. This presents a hazard because the motor vehicle tends to slip sideways. When $S = 0$, the speed of the motor vehicle is the same as that of the wheel and no braking force is transmitted from the wheel to the road surface, so that it is impossible to stop the vehicle unless air resistance or the gradient of the road is utilized. As is well known to a person skilled in the art, $S = 0.2$ or thereabout is a slip rate which is most desirable because the hazard of sideways skidding can be avoided and the vehicle has a short braking distance.

Antiskid devices for air brakes are designed, based on the aforesaid theory, to maintain the slip rate at about 0.2 when the brake is applied. An antiskid device of the prior art comprises a modulator mounted in a pressurized air line connecting a brake valve to brake actuators, and a signal producing means for producing a pressure reducing signal when the braking pressure applied by the brake actuators has reached a pressure increase target value, the pressure reducing electric signal actuating the modulator to reduce the braking pressure applied by the brake actuators, whereby the slip rate of the wheels can be maintained at an optimum level of 0.2 or thereabout.

Some disadvantages are associated with antiskid devices of the prior art constructed as aforesaid. For example, there is a time lag of the initiation of a reduction in the braking pressure caused by the operation of the modulator behind the production of a pressure reducing electric signal. This has hitherto caused a rise in the braking pressure applied by the brake actuators to an unnecessarily high level, with the result that skidding of a moderate degree has occurred or the braking force has not been high enough.

SUMMARY OF THE INVENTION

This invention obviates the aforesaid disadvantages of the prior art. Accordingly, the invention has for its object the provision of an antiskid device for air brakes which can minimize the rise of a braking pressure above a pressure increase target value caused by a time lag of the initiation of a reduction in the braking pressure behind the production of a pressure reducing electric signal and which can minimize the time lag, so that skidding of a moderate degree can be prevented, the brake can be applied efficiently and the braking distance can be shortened.

The outstanding characteristics of the invention are that the modulator of the antiskid device in accordance with the present invention comprises a first valve which can move between an open position in which it allows pressurized air from the brake valve to pass freely therethrough and a throttling position in which it allows the pressurized air to pass therethrough in a reduced quantity, a second valve connected in series with the first valve and capable of moving between an open position in which it allows the pressurized air from the first valve to pass freely therethrough and a discharge position in which it allows pressurized air from the brake actuators to be discharged therethrough, a first air operating means for operating the first valve and a second air operating means for operating the second valve. There is provided a signal producing means adapted to produce a throttling electric signal for actuating the first air operating means and moving the first valve to its throttling position before the braking pressure of the brake acutator reaches a pressure increase target value, and to produce a pressure reducing electric signal for actuating the second air operating means and moving the second valve to its discharge position about the time the braking pressure of the brake actuator reaches the target value. By this arrangement, the increase in the braking pressure of the brake actuator can be reduced in speed about the time the braking pressure reaches the target value so as to thereby avoid a rise of the braking pressure above the target value which would otherwise occur due to a time lag of the initiation of a reduction in the braking pressure of the brake actuators behind the production of a pressure reducing electric signal. The time lag can be reduced by utilizing the force of air for actuating the first and second valves.

Before giving detailed explanation of a preferred embodiment of the present invention, an antiskid device for air brakes of the prior art will be outlined with reference to FIG. 1 to enable the invention to be clearly understood. A conventional antiskid device for air brakes is generally constructed as shown in FIG. 1 in a block diagram, in which the numeral 4 designates a brake valve adapted to be operated by the driver of a motor vehicle and the numeral 5 refers to a relay valve for relaying pressurized air produced by the brake valve 4. The pressurized air thus relayed is applied to brake actuators 3 through a modulator 6 to actuate brake drums 2 and apply the brake to wheels 1 of the motor vehicle. Meanwhile the number of revolutions of each wheel 1 is sensed by a wheel speed sensor 7 and the result is supplied to a computer 8 to determine whether the wheel 1 is in a state of $S = 1$ or $S = 0$ or drawing near such state.

Many solutions have come to mind to solve the problem of detecting the condition of wheels, but they all aim at accomplishing the same thing or producing a signal for adjusting the braking pressure so that the wheels 1 may be maintained in a state of $S = 0.2$ without being brought to the state of $S = 1$ or $S = 0$. Accordingly, the computer 8 comprises a signal producing means which generally produces an electric signal for actuating the modulator 6 so as to effect adjustments of the braking pressure applied to each brake actuator 3 to thereby control the condition of operation of each wheel 1.

The operation of the modulator 6 of a conventional antiskid device for air brakes is shown in FIG. 2 in chronological sequence. As shown, the pressurized air in each brake actuator is discharged when the electric signal is ON and pressurized air is supplied to each brake actuator when the electric signal is OFF. In this operation, there is a time lag of the occurrence of a variation in the braking pressure of the brake actuator due to actuation of the modulator behind switching of the electric signal between ON and OFF states. This causes the braking pressure in each brake actuator to become much higher or lower than is necessary and the result of this is that the wheels tend to fluctuate between the states of $S = 1$ and $S = 0$. To obviate these disadvantages, proposals have been made to cause the modulator to act promptly, to reduce the distance between the modulator and each brake actuator to reduce the time lag T and to improve the method of detection used by the computer 8 so as to produce an electric signal earlier than has hitherto been produced. None of these measures has however been satisfactory.

The antiskid device for air brakes in accordance with the present invention is constructed such that it enables to minimize an excessive rise in the braking pressure applied by each brake actuator to prevent the occurrence of minor skidding and permits to apply the brake efficiently, so that the braking distance can be reduced.

The principle of the present invention will now be described with reference to FIG. 3 in which P designates a pressure existing in each brake actuator 3 (the pressure P will be hereinafter referred to as a pressure increase target value) at the time the computer 8 produces a pressure reducing signal for reducing the braking pressure applied by the brake actuator. As aforesaid, there is the time lag T of the initiation of a reduction in the pressure in the brake actuator behind the production of a pressure reducing electric signal. If the speed at which the pressure in the brake actuator 3 increases is high as indicated by a pressure change line 9, there will be an excess pressure $\Delta P_1$ which is too high and is not desirable. On the other hand, if the speed at which the pressure in the brake actuator 3 increases is low as indicated by a pressure change line 10, there will be an excess pressure $\Delta P_2$ which is too low. However, the reduction of the speed of pressure increase to such a low level will result in a time interval $T_s$ required for the pressure to reach the pressure applying target value P being greater than a time interval $T_q$ required for the pressure to reach the pressure increase target value P when the speed of pressure change is high. Thus, reducing the pressure applying speed also has disadvantages because the low braking pressure time interval will be prolonged and consequently the braking distance will become greater.

In accordance with the present invention, the advantages of the pressure change lines 9 and 10 are combined with each other and pressure is first applied at a high speed as indicated by a pressure change line 11 in FIG. 4 till the pressure draws near the pressure increase target value and then the speed at which pressure is applied is reduced as indicated by a pressure change line 12 in FIG. 4. Also, pressurized air is utilized for operating the brake actuator to greatly reduce the time lag T whereby an excessive pressure rise can be minimized.

BRIEF DESCRIPTION OF THE DRAWINGS

For better understanding of the invention, reference may be had to the following description taken in conjunction with the accompanying drawings, wherein.

DESCRIPTION OF THE PREFERRED EMBODIMENT

Figure 1:
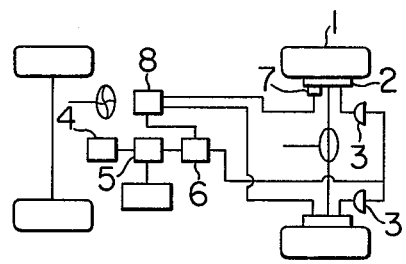
FIG. 1 is a block diagram of an air brake system provided with an antiskid device with which the present invention is concerned.
Figure 2:
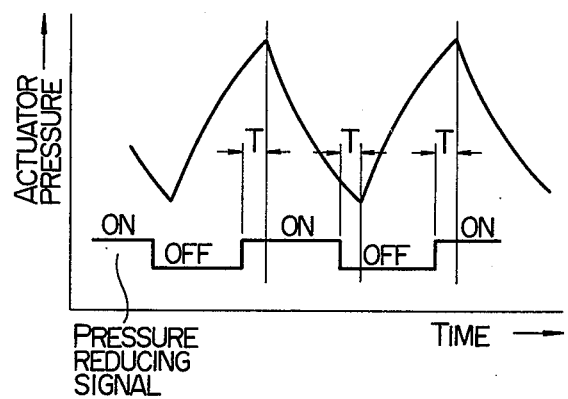
FIG. 2 is a graph showing, in chronological sequence, the relation between pressure reducing signals and the braking pressures of each brake actuator of a conventional antiskid device.
Figure 3:
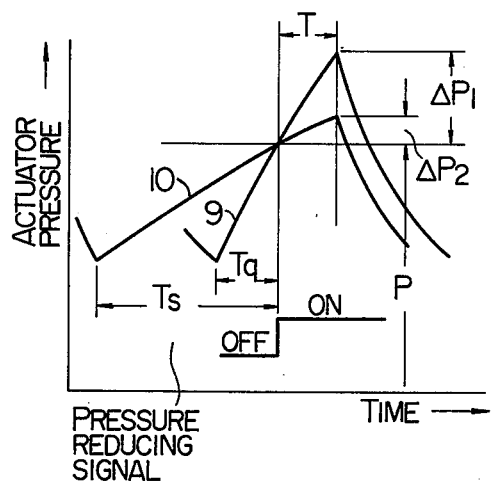
FIG. 3 and FIG. 4 are graphs showing, in chronological sequence, the relation between the pressure reducing electric signal and the braking pressure applied by each brake actuator in explanation of the principle of the invention.
Figure 4:
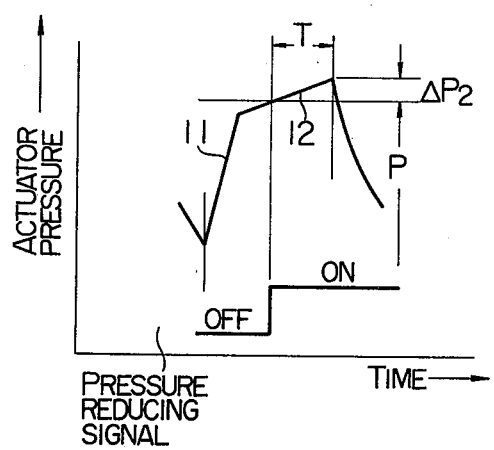
Figure 5:
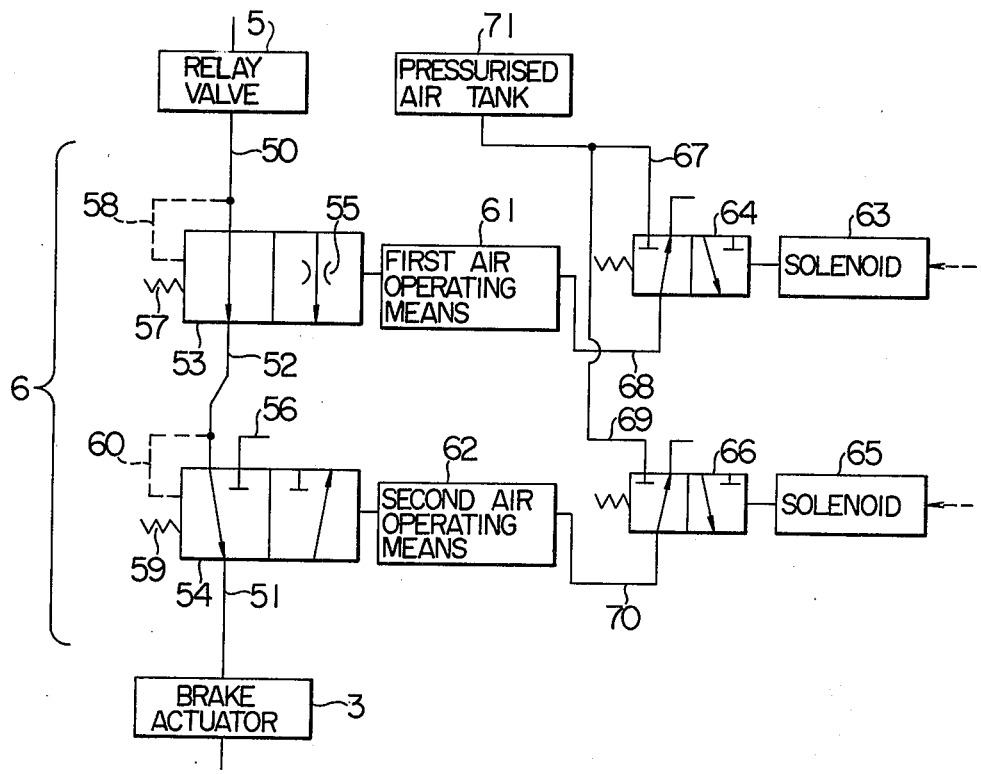
FIG. 5 is a diagram showing one embodiment of the invention.

A preferred embodiment of the invention will now be described with reference to the drawings. In FIG. 5, there is shown the modulator 6 used in the antiskid device according to the invention. As shown, the modulator 6 comprises a first valve 53 and a second valve 54 connected in series with each other by a pressurized air supply line 52, the first valve 53 being connected to the relay valve 5 through a pressurized air supply line 50 and the second valve 54 being connected to the brake actuator 3 through a pressurized air supply line 51. The first valve 53 can move between an open position in which it allows pressurized air to pass freely therethrough and a throttling position in which it allows the pressurized air to pass therethrough in a reduced quantity by means of a throttle 55. The second valve 54 can move between an open position in which it allows the pressurized air to pass freely therethrough and a discharge position in which it permits the pressurized air in the brake actuator 3 to be discharged through an outlet port 56. The first valve 53 is urged by the biasing force of a spring 57 and by the force of a self-shift 58 to move rightwardly in FIG. 5, so that the first valve 53 is normally disposed in its open position. The second valve 54 is urged by the biasing force of a spring 59 and by the force of a self-shift 60 to move rightwardly in the figure, so that the second valve 54 is normally disposed in its open position too.

The modulator also comprises a first air operating means 61 and a second air operating means 62 which operate the first valve 53 and the second valve 54 respectively. The first air operating means 61 is connected through a line 68 to an electromagnetic valve 64 having a solenoid 63, while the second air operating means 62 is connected through a line 70 to an electromagnetic valve 66 having a solenoid 65. The electromagnetic valves 64 and 66 are connected through lines 67 and 69 respectively to a pressurized air tank 71. If an electric signal is supplied as an input from a signal supply means or the computer 8 to solenoids 63 and 65, then electromagnetic valves 64 and 66 are actuated so that lines 67 and 68 may be interconnected and lines 69 and 70 may be interconnected. Thus, the pressurized air supplied from the tank 71 actuates the first and second air operating means 61 and 62, so that the first and second valves 53 and 54 are moved to their throttling and discharge positions respectively by overcoming the biasing forces exerted by springs 57 and 59 and the forces exerted by self-shifts 58 and 60.

Figure 6:
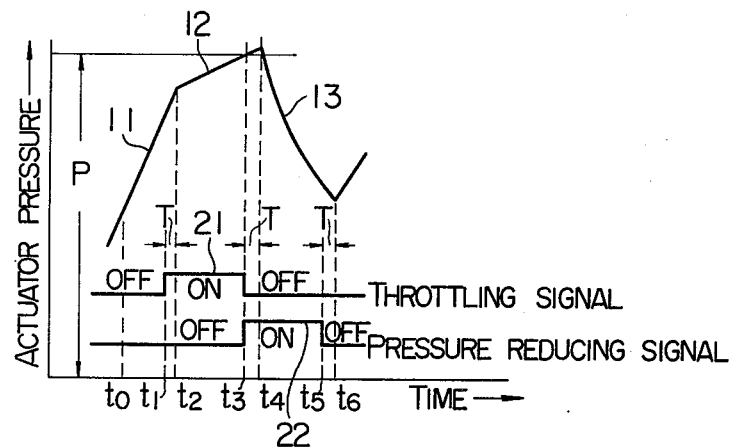
FIG. 6 is a graph showing, in chronological sequence, the relation between the pressure reducing electric signal and the throttling signal and changes in the braking pressure in the antiskid device according to the invention.

The operation of the modulator 6 constructed as aforementioned will be described in chronological sequence with reference to FIG. 6. The modulator shown in FIG. 5 is in a normal state or in a state in which no signal is supplied from the computer 8 thereto. Normally the first and second valves 53 and 54 are in open positions and the pressurized air from the relay valve 5 flows successively through line 50, first valve 53, line 52, second valve 54 and line 51 to the brake actuator 3, thereby causing a sudden rise in the braking pressure applied by the brake actuator 3. This is represented in FIG. 6 by a sudden pressure increase line 11 between times $t_o$ and $t_2$. At a time $t_1$ prior to the approaching of the braking pressure to the pressure increase target value P, the computer 8 detects that the braking pressure of the actuator 3 is drawing near the pressure increase target value P and produces a throttling signal 21 which is applied to solenoid 63 of the modulator 6 to actuate electromagnetic valve 64. The result of this is that lines 67 and 68 are interconnected to permit the pressurized air in the tank 71 to be supplied to the air operating means 61. The first valve 53, which is normally disposed in the open position by virtue of the biasing force of spring 57 and the force of the pressurized air in line 50 which is applied by the self-shift 58 to the first valve 53, moves leftwardly in FIG. 5 because the pressurized air supplied to the air operating means 61 from the tank 71 overcomes the biasing force of spring 57 and the force of the pressurized air exerted by self-shift 58 on the first valve 53. This causes the throttle 55 to be interposed between lines 50 and 52, thereby reducing the quantity of the pressurized air flowing to the brake actuator 3 and the rise in pressure reduced in speed. This is shown in FIG. 6 as a slow rise of the braking pressure from the time $t_2$ following the time lag T of $t_2$ behind $t_1$.

As the pressure applied by the brake actuator 3 reaches the pressure increase target value P, the computer 8 detects this (at a time $t_3$) and supplies a pressure reducing signal 22 (See FIG. 6) to solenoid 65 shown in FIG. 5. In the same manner as described with reference to solenoid 63, solenoid 65 causes the air operating means 62 to move the second valve 54, which is disposed in the open position by virtue of the biasing force of spring 59 and the force of the pressurized air exerted by self-shift 60, leftwardly in FIG. 5. This disconnects line 52 from line 51 and connects line 51 to the outlet port 56, so that the pressurized air in the brake actuator 3 is released to atmosphere through the outlet port 56. Referring to FIG. 6, the pressure reducing electric signal 22 is produced at the time $t_3$ and the braking pressure follows a suddenly reduced pressure line 13 after a time $t_4$ following a time lag T.

After the pressure reducing electric signal 22 is produced, no pressurized air flows through lines 50 and 52 and the function of the first valve 53 loses significance. Therefore, the throttling electric signal 21 is preferably turned off as soon as the pressure reducing electric signal 22 is produced to economize on electricity and reduce the load applied to the computer. Turning off the throttling electric signal 21 restores electromagnetic valve 64 to its discharge position shown in FIG. 5 and permits the pressurized air in the air operating means 61 to be vented to atmosphere. This permits the first valve 53 to move rightwardly in FIG. 5 to its open position by the action of spring 57 and self-shift 58.

Figure 7:
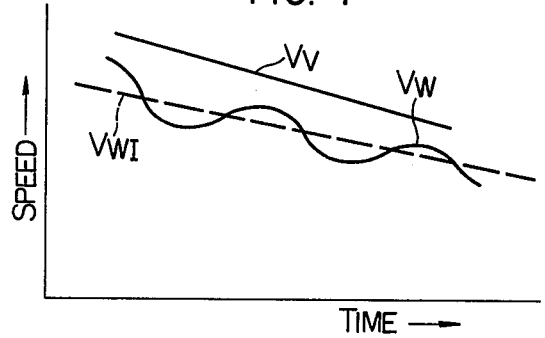
FIG. 7 is a graph showing the relation between the vehicle speed $Vv$ prevailing when the brake is applied, the ideal wheel speed $V_{wI}$ and the actual speed $Vw$ prevailing when the antiskid device is put to use.

A reduction in the braking pressure applied by the brake actuator 3 results in a reduction in the braking force applied to the wheel and eliminates the danger of the slip rate of the wheel becoming from $S = 0.2$ to $S = 1$. However, there will be the danger of the slip rate becoming from $S = 0.2$ to $S = 0$. If this is the case, the computer 8 detects this and turns off the pressure reducing electric signal 22 (at a time $t_5$). This de-energizes solenoid 65 and restores the second valve 54 to its open position shown in FIG. 5 in the same manner as the first valve 53 is restored to its open position as aforesaid. This allows the pressurized air in the relay valve 5 to flow into the brake actuator 3 at a time $t_6$ following a time lag T. The aforementioned cycle of operations from the time $t_o$ to the time $t_6$ is repeated, so that the speed of revolution of the wheel can be controlled such that it is, as represented by a curve $Vw$ in FIG. 7, near an ideal speed $VwI$ in which $S = 0.2$ relative to a vehicle speed $Vv$.

From the foregoing description, it will be appreciated that in the antiskid device according to the invention, a throttling electric signal is produced before the braking pressure reaches the pressure increase target value P to reduce the rate of an increase in the braking pressure about the time the braking pressure reaches the target value, thereby preventing an excessive rise in the braking pressure which would otherwise occur due to a time lag of the initiation of a reduction in the braking pressure behind the production of a pressure reducing electric signal.

In the antiskid device according to the invention, the force of air is utilized for actuating the first and second valves and this enables the valves to operate at high speeds and permits the time lag itself to be reduced.

Moreover, the use of the self-shift mechanism for keeping the first valve 53 and the second valve 54 in their open positions enables these valves to be maintained in these positions with increased stability so long as there exists pressurized air in lines 50 and 52.

Figure 8:
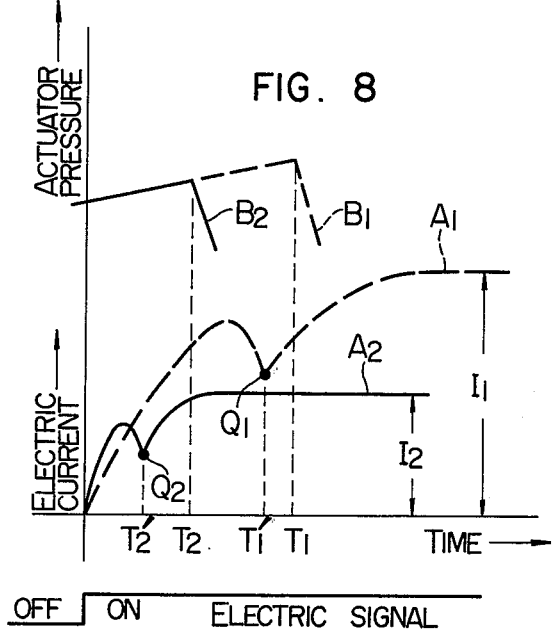
FIG. 8 is a graph showing the relation between a time lag produced when the air operating means according to the invention is used and a time lag produced when the conventional electromagnetic valve is used.

The advantages offered by the use of pressurized air for operating the valves in accordance with the invention will be described in some detail with reference to FIG. 8. In case a valve is directly actuated by a solenoid, a plunger of the solenoid will have a heavy weight and consequently the time constant of the current in the coil will be increased. Thus, as represented by a broken line $A_1$, the plunger will reach the end of its stroke at a point $Q_1$ after lapse of a time $T'_1$ following the production of an electric signal. Accordingly, the braking pressure of the brake actuator will, as represented by broken lines, begin to respond after lapse of a time $T_1$. The difference in time between $T'_1$ and $T_1$ is due to the presence of a passage between the valve and the brake actuator.

On the other hand, the use of the air operating means for operating the valves as described with reference to the embodiment of the invention can produce a quick response in the current in the coil because the solenoid used for actuating each air operating means can be small in size. As indicated by a point $Q_2$ in a solid line $A_2$, the stroke reaches its end at a time $T'_2$ following the production of an electric signal. Whereas $T'_1$ is substantially in a range between 15 and 20 milliseconds, $T'_2$ is substantially in a range between 3 and 8 milliseconds after production of the signal. This means that the operation speed is 3 times as high when the air operation means are used as when no air operation means is used. It takes about 1 to 3 milliseconds for the air operating means to actuate the valves. Even if this delay is added to the delay of the pressurized air reaching the brake actuator, the overall delay $T_2$ is much shorter than $T_1$. Moreover, since the use of solenoids involves a very low level of consumption of electricity as shown, the use of the air operating means is economical.

The use of the air operating means has added advantages. Since the modulator using the air operating means produces a higher power per unit weight, the invention makes it possible to obtain an overall compact size in a modulator. This makes the antiskid device highly resistant to vibration and reliable in performance.

I claim:

1. In an antiskid device for air brakes comprising a modulator mounted in a pressuried air line connecting a brake valve to brake actuators, and a signal producing means adapted to produce a pressure reducing electric signal when the braking pressure of each of said brake actuators has reached a pressure increase target value which pressure reducing electric signal is applied to said modulator to actuate the same so as to reduce the braking pressure applied by each said brake actuator to maintain the slip rate at an optimum value of 0.2 or thereabout by changing the speed of wheels, the improvements wherein said modulator comprises:

a. a first valve capable of moving between an open position in which it allows pressurized air from said brake valve to pass freely therethrough and a throttling position in which it allows the pressurized air to pass therethrough in a reduced quantity;

b. a second valve connected in series with said first valve and capable of moving between an open position in which it allows the pressurized air from said first valve to pass freely therethrough and a discharge position in which it permits pressurized air from the brake actuators to be discharged therethrough;

c. a first air operating means for operating said first valve; and d. a second air operating means for operating said second valve;

said signal producing means first producing a throttling electric signal for actuating said first air operating means and moving said first valve to its throttling position before the braking pressure of the brake actuators reaches the pressure increase target value, and then producing the pressure reducing electric signal for actuating said second air operating means and moving said second valve to its discharge position when the braking pressure has reached the pressure increase target value, whereby an increase in the braking pressure of the brake actuators can be reduced in speed about the time the braking pressure reaches the pressure increase target value so as to thereby avoid an excessive rise of the braking pressure above the pressure increase target value which would otherwise occur due to a time lag of the initiation of a reduction in the braking pressure of the brake actuators behind the production of a pressure reducing electric signal, and the time lag can be reduced by utilizing the force of air for actuating said first valve and said second valve.

* * * * *